United States Patent [19]

Fischer

[11] Patent Number: 4,943,195
[45] Date of Patent: Jul. 24, 1990

[54] EXPANSIBLE ANCHORING PLUG ASSEMBLY

[75] Inventor: Artur Fischer, Waldachtal, Fed. Rep. of Germany

[73] Assignee: Fischerwerke Artur Fischer GmbH & Co. KG, Tumlingen, Fed. Rep. of Germany

[21] Appl. No.: 203,734

[22] Filed: Jun. 7, 1988

[30] Foreign Application Priority Data

Jun. 13, 1987 [DE] Fed. Rep. of Germany ....... 3719798

[51] Int. Cl.⁵ ............................................. F16B 13/06
[52] U.S. Cl. ....................................... 411/55; 411/54; 411/60
[58] Field of Search ................................. 411/44–57, 411/60; 52/704; 405/258, 259

[56] References Cited

U.S. PATENT DOCUMENTS

| | | | |
|---|---|---|---|
| 4,112,814 | 9/1978 | Schäfers | 411/52 |
| 4,475,329 | 10/1984 | Fischer | 405/259 X |
| 4,560,311 | 12/1985 | Herb et al. | 411/54 X |
| 4,770,580 | 9/1988 | Fischer | 411/54 X |

FOREIGN PATENT DOCUMENTS

| | | | |
|---|---|---|---|
| 0060973 | 9/1982 | European Pat. Off. | 411/45 |
| 0067941 | 12/1982 | European Pat. Off. | 405/259 |
| 2548495 | 5/1976 | Fed. Rep. of Germany | 411/55 |
| 3117581 | 11/1982 | Fed. Rep. of Germany | 411/54 |
| 58019 | 12/1924 | Sweden | 411/55 |
| 2109886 | 6/1983 | United Kingdom | 411/57 |

*Primary Examiner*—Gary L. Smith
*Assistant Examiner*—Jerry Redman
*Attorney, Agent, or Firm*—Michael J. Striker

[57] ABSTRACT

An expansible anchoring plug assembly for anchoring objects to a supporting structure and insertable in a hole having a widening undercut portion comprises a slotted expansible sleeve pushed onto an expander cone which is inserted into the hole upon the rotation of the threaded bolt fastened to the part carrying the expander cone. The expander cone is provided at its end face with a projection or ridge which acts on the bottom wall of the hole and secures the expander cone against rotation.

12 Claims, 1 Drawing Sheet

EXPANSIBLE ANCHORING PLUG ASSEMBLY

BACKGROUND OF THE INVENTION

The present invention relates to an anchoring plug assembly used for fastening an object to a supporting structure. More particularly, the invention relates to an anchoring assembly for anchoring in drilled holes having widening undercut portions.

An anchoring plug assembly or an expansion dowel of the type under discussion comprises a slotted expansion sleeve and an expander cone which is movable in the axial direction of the sleeve by a bolt to anchor the plug in the hole provided in the supporting structure, for example, masonry.

Anchoring plugs of the foregoing type have been disclosed, for example, in applicant's U.S. Pat. Nos. 3,277,623; 3,082,657; 3,524,379; 3,815,467; 4,094,054; 4,094,223; 4,182,091; 4,065,996; 4,050,346; 4,516,378, etc. When using bored holes which are widened at their leading ends it is possible to achieve anchorages which are virtually free from expansion pressures and which additionally produce even higher holding values owing to the increased expansion of the fixing element which is the aforementioned bolt. Known expansible anchoring plugs have an expander cone onto which an expansible sleeve can be driven by a suitable driving-in tool. The expander cone can be formed on a further bolt which is joined by a screw connection to the threaded bolt. The threaded bolt projects with its external end from the drilled hole and may have an external thread so that an article to be anchored to the supporting structure can be screwed tightly to the external wall of this structure, such as masonry or a ceiling, by means of a nut.

Known expansible anchoring plugs which can be inserted by being driven into a bored hole having a frustoconical undercut require special driving-in tools and are not readily adaptable to different clamping lengths of the articles to be anchored to masonry or ceilings.

SUMMARY OF THE INVENTION

It is an object of the present invention to provide an improved expansible anchoring plug assembly.

It is a further object of this invention to provide an anchoring plug assembly which is easy to install and is readily adaptable to different clamping lengths of the objects being anchored.

These and other objects of the invention are attained by an anchoring plug assembly for anchoring an object in a pre-drilled hole having a widening undercut portion at a leading end thereof in a supporting structure, comprising a bolt terminated with an expander cone which in an inserted position of the plug assembly acts on a bottom of said hole; an expansible sleeve having slots producing expansible sections over a part of a length of said sleeve, said sleeve surrounding said expander cone; and fixing means having a thread by which said fixing means is connected to said expander cone, said fixing means being rotated so that said expansible sleeve is pushed onto said expander cone whereby said expander cone acts on said expansible sections to expand them in said undercut portion, said expander cone having a leading end face and including at said end face at least one securing element which engages the undercut portion of the hole to secure said expander cone against rotation.

Projections, ridges or integrally moulded spikes which act on the masonry at the bottom of the bored hole and thus secure the bolt against unwanted rotation may be used as securing means. The fixing means which is preferably constructed as a threaded bolt, can now be screwed in the direction of the bolt with the expander cone using a suitable screwdriver, wherein the threaded bolt pushes the expansible sleeve onto the expander cone.

The fixing means may have a trailing end projecting outwardly of the hole in said inserted position and provided with a tool-engagement area on which a tool for rotating said fixing means is placed. The tool may be a screwdriver or a drill.

The assembly may further include a low-friction element positioned between said fixing means and said expansible sleeve.

A plastic washer with a through guide passage for the threaded portion of the bolt may form the low-friction element.

A further securing element may be provided which projects laterally from said expander cone and engages in one of said slots of said expansible sleeve.

During installation, after only slight expansion the expander cone jams so firmly against the wall of the bored hole that the expander cone, in conjunction with the securing element, forms the means securing the bolt against rotation.

For receiving a screwdriver or a drill, a hexagon head or lateral flat faces may be provided on the projecting end of the threaded bolt.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
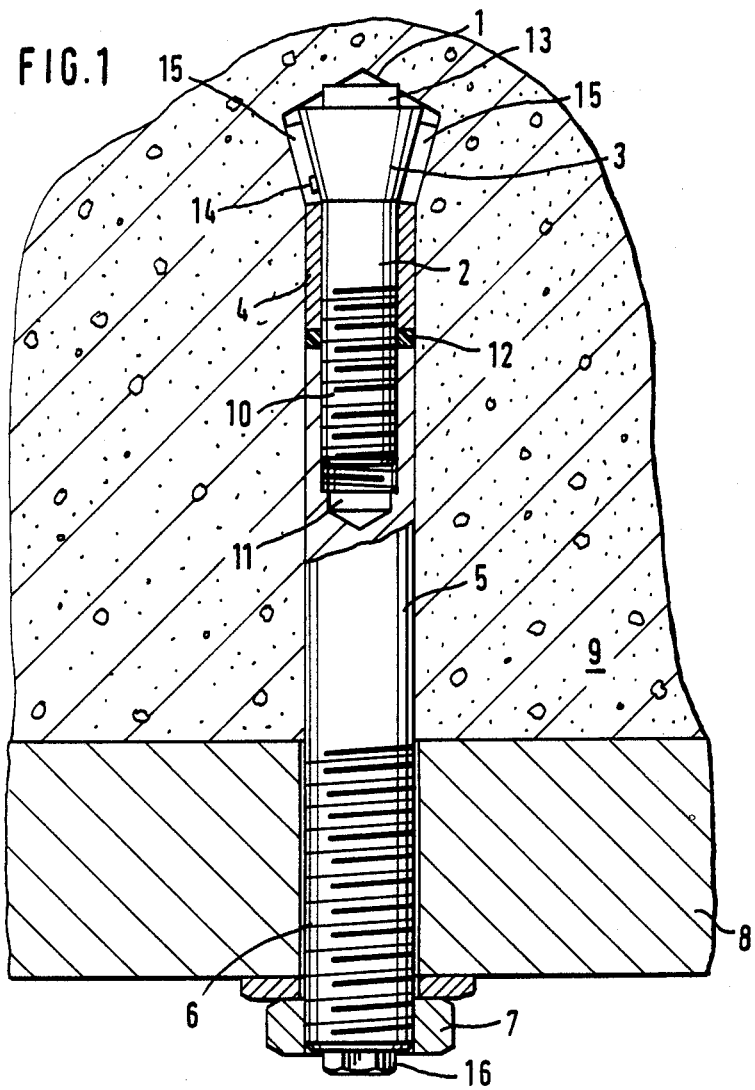
FIG. 1 is a partially sectional view of the expansible anchoring plug according to the invention, with an object being to a supporting structure.

Referring now to the drawings in detail, and firstly to FIG. 1 thereof, it will be seen that a plug assembly according to the invention is inserted in a pre-drilled hole 1 provided in a supporting structure 9. Hole 1 has a leading end portion or undercut which has a frustoconical shape and widens outwardly in the region of the bottom of hole 1.

The expansible anchoring plug includes a bolt 2 terminated with an expander cone 3, an expansible sleeve 4 which is slotted lengthwise at 15 over a portion thereof to produce expansible sections as known, and a threaded bolt 5 which represents a fixing part and extends in assembly outwardly of the hole 1 and through an object 8. The threaded bolt 5 has at its end projecting outwardly of hole 1, an external thread 6 onto which a nut 7 is screwed against object 8. The latter is thereby pressed against the outer wall of masonry 9.

Bolt 2 has a threaded portion 10 which is engaged in a threaded bore 11 of bolt 5. Reference numeral 20 designates a washer. If, prior to attaching nut 7 to bolt 5, the threaded bolt 5 is rotated relative to bolt 2 the threaded bolt 5 is displaced towards the expander cone 3. The expansible sleeve 4 during this displacement is pushed onto the expander cone 3 until sleeve 4 assumes the position shown in FIG. 1. To ensure that as little friction as possible is generated between threaded bolt 5 and the expansible sleeve 4 as the latter is pushed on, a low-friction material disc 12, made preferably of plastic, is provided. Disc 12, as shown, is positioned between the leading end of bolt 5 and the trailing end of expansible sleeve 4. As further shown in FIG. 1, expander cone 3 is provided at the leading end thereof with an element 13 of disc-like or ridge-shape and at least one lateral rib or projection 14 at the conical face of the expander cone. The function of element 13 and projection 14 will be explained below.

As the threaded bolt 5 is rotated it is driven into hole 1 so that securing element 13, which can be molded on the end face of the expander cone 3, acts against the bottom of the drilled hole. Thus, the securing element 13 ensures that bolt 2 will not turn along with threaded bolt 5 as the latter is rotated during its insertion into hole 1.

Projection 14 is a further safe-guarding means against undesired rotation of bolt 2. Projection 14 engages in one of longitudinal slots 15 of the expansible sleeve 4 upon the driving of sleeve 4 onto expander cone 3. As soon as expansible sleeve 4 is securely seated so that it cannot rotate due to a slight expansion of the sleeve in hole 1, projection 14 forms the means for securing sleeve 4 and bolt 2 against rotation.

Figure 2:
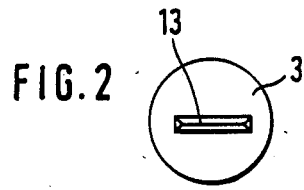
FIG. 2 is a top plan view of the end face of the expander cone of the plug shown in FIG. 1.

Means for securing the elements of the plug assembly against rotation, namely elements 13 and 14 may be formed as lugs, spikes or sharp edges (FIG. 2).

In order to enable a user to position a screwdriver or any other suitable tool externally on the threaded bolt 5 the latter has lateral flat faces or a hexagon head 16. Alternatively, any other suitable shape of the external end portion of bolt 5 can be provided to obtain a positive engagement with a suitable tool 18.

FIG. 2 shows the leading end face of the expander cone 3 the securing element of which is formed as a ridge which tapers towards the end.

Figure 3:
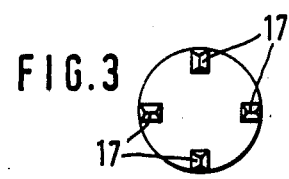
FIG. 3 is a top plan view of the expander cone according to another embodiment of the invention.

FIG. 3 shows a further embodiment of the element which secures the expander cone 3 against rotation. This element is a number of lugs or spikes 17.

In any event, the afore-described rotation-resistant means, such as projections, ridges, spikes or the like integrally moulded at the end face of the expander cone, act on the masonry or ceiling at the bottom of the drilled hole and thereby secure the bolt against undesired rotation.

In this manner, a very simple assembly is achieved, and the use of threaded bolts of different length allows for the adaptation to different clamping lengths of the articles to be fixed.

It will be understood that each of the elements described above, or two or more together, may also find a useful application in other types of anchoring plug assemblies differing from the types described above.

While the invention has been illustrated and described as embodied in an anchoring plug assembly, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An anchoring plug assembly for anchoring an object in a hole having a widening undercut portion at a leading end thereof and pre-drilled in a supporting structure, comprising a bolt terminated with an expander cone which in an inserted position of the plug assembly acts on a bottom of said hole; an expansible sleeve having slots producing expansible sections over a part of a length of said sleeve, said sleeve surrounding said expander cone; and fixing means having a thread by which said fixing means is connected to said expander cone, said fixing means being rotated so that said expansible sleeve is pushed onto said expander cone whereby said expander cone acts on said expansible sections to expand them in said undercut portion, said expander cone having a leading end face and including at said end face at least one securing element which engages the in undercut portion of the hole to secure said expander cone against rotation.

2. The plug assembly as defined in claim 1, wherein said fixing means has a trailing end projecting outwardly of the hole in said inserted position and provided with a tool-engagement area on which a tool for rotating said fixing means is placed.

3. The plug assembly as defined in claim 2, wherein said tool is a screwdriver.

4. The plug assembly as defined in claim 2, wherein said tool is a drill.

5. The plug assembly as defined in claim 1, further including a low-friction element positioned between said fixing means and said expansible sleeve.

6. The plug assembly as defined in claim 5, wherein said low-friction element is a plastic washer formed with a guide passage.

7. The plug assembly was defined in claim 5, wherein said fixing means comprises a bolt member having an internal thread defining said thread of said fixing means, said bolt terminated with an expander cone having a threaded portion engaging said internal thread of said bolt member.

8. The plug assembly as defined in claim 7, wherein said threaded bolt has a hexagonal head to form a tool-engagement area.

9. The plug assembly as defined in claim 1, wherein a further securing element is provided, which projects laterally from said expander cone and engages in one of said slots of said expansible sleeve.

10. The plug assembly as defined in claim 2, wherein said tool-engagement area includes flat faces.

11. The plug assembly as defined in claim 1, wherein said securing element is a ridge.

12. The plug assembly as defined in claim 1, wherein said one securing element is a projection extending outwardly from said leading end face of said expander cone and having a leading end, said one securing element tapering to said leading end thereof.

* * * * *